(12) United States Patent
Lishak

(10) Patent No.: US 8,954,344 B2
(45) Date of Patent: Feb. 10, 2015

(54) METHODS OF OFFLINE FARE COLLECTION FOR OPEN-LOOP AND HYBRID CARD SYSTEMS

(76) Inventor: Evgeny Lishak, Vaughan (CA)

( * ) Notice: Subject to any disclaimer, the term of this patent is extended or adjusted under 35 U.S.C. 154(b) by 30 days.

(21) Appl. No.: 13/757,324

(22) PCT Filed: Nov. 23, 2011

(86) PCT No.: PCT/CA2011/001283
§ 371 (c)(1),
(2), (4) Date: Feb. 1, 2013

(87) PCT Pub. No.: WO2012/088582
PCT Pub. Date: Jul. 5, 2012

(65) Prior Publication Data
US 2013/0173357 A1    Jul. 4, 2013

(30) Foreign Application Priority Data

Dec. 29, 2010  (CA) .................................. 2726781

(51) Int. Cl.
| | | |
|---|---|---|
| *G07B 15/00* | (2011.01) | |
| *G07B 15/02* | (2011.01) | |
| *G06K 5/00* | (2006.01) | |
| *G06Q 10/00* | (2012.01) | |
| *G06Q 20/00* | (2012.01) | |
| *G07C 9/00* | (2006.01) | |

(52) U.S. Cl.
CPC .............. *G07B 15/00* (2013.01); *G06Q 10/00* (2013.01); *G06Q 20/00* (2013.01); *G07C 9/00015* (2013.01)
USPC .............. 705/13; 235/380; 235/384; 235/382

(58) Field of Classification Search
CPC ...... G06Q 20/20; G06Q 20/40; G06Q 20/204; G06Q 20/32
USPC .................. 705/13, 41, 38; 235/380, 384, 382
See application file for complete search history.

(56) References Cited

U.S. PATENT DOCUMENTS

| | | | | |
|---|---|---|---|---|
| 4,558,211 | A * | 12/1985 | Berstein ........................ | 235/380 |
| 4,943,707 | A * | 7/1990 | Boggan ........................ | 235/380 |
| 5,202,550 | A * | 4/1993 | Kocznar et al. .............. | 235/382 |
| 5,285,382 | A * | 2/1994 | Muehlberger et al. ......... | 705/17 |
| 5,514,857 | A * | 5/1996 | Corless ........................ | 235/384 |
| 6,260,026 | B1 * | 7/2001 | Tomida et al. ................ | 705/38 |
| 6,747,687 | B1 * | 6/2004 | Alves ........................... | 348/148 |
| 7,519,734 | B1 * | 4/2009 | Dumitriu et al. ............. | 709/238 |

(Continued)

OTHER PUBLICATIONS

Corresponding PCT International Application No. PCT/CA2011/001283 Search Report dated Feb. 15, 2012.

(Continued)

*Primary Examiner* — Brian Epstein
(74) *Attorney, Agent, or Firm* — Perry + Currier Inc.

(57) ABSTRACT

Interconnected methods of card-based fare collection at computer-based service access validation terminals are disclosed. The first method is characterized by periodically propagating to the validation terminals card transaction data originated at other validation terminals. This method is most pertinent to the public transit fare systems utilizing open-loop payment cards and vehicle-installed terminals. The second method is characterized by actualizing the validation terminals' data by way of data broadcasting or multicasting. This method makes the first method practical and improves performance of open-loop and closed-loop card systems implementing offline validations.

15 Claims, 10 Drawing Sheets

(56) References Cited

U.S. PATENT DOCUMENTS

| | | |
|---|---|---|
| 2003/0115095 A1 | 6/2003 | Yamauchi |
| 2005/0033829 A1 | 2/2005 | Oommen |
| 2006/0278704 A1* | 12/2006 | Saunders et al. ............... 235/382 |
| 2007/0150336 A1* | 6/2007 | Boily ............................... 705/13 |
| 2008/0033880 A1* | 2/2008 | Fiebiger et al. ................. 705/44 |
| 2008/0135612 A1* | 6/2008 | Silbernagl et al. ............. 235/382 |
| 2008/0140516 A1 | 6/2008 | Silbernagl et al. |
| 2008/0156873 A1* | 7/2008 | Wilhelm et al. ............... 235/384 |
| 2008/0179394 A1* | 7/2008 | Dixon et al. ................... 235/380 |
| 2009/0119213 A1* | 5/2009 | Hammad et al. ................ 705/44 |
| 2009/0127332 A1* | 5/2009 | Park et al. ...................... 235/380 |
| 2011/0166936 A1* | 7/2011 | Dixon et al. ............... 705/14.58 |
| 2011/0166997 A1* | 7/2011 | Dixon et al. .................... 705/41 |
| 2011/0302081 A1* | 12/2011 | Saunders et al. ................ 705/39 |

OTHER PUBLICATIONS

Corresponding PCT International Application No. PCT/CA2011/001283 Written Opinion of the International Searching Authority.

\* cited by examiner

_US 8,954,344 B2_

METHODS OF OFFLINE FARE COLLECTION FOR OPEN-LOOP AND HYBRID CARD SYSTEMS

FIELD

The present specification relates generally to computing devices and more specifically relates to service fare collection systems using computerized payment instruments, like smartcards, and computerized fare payment terminals.

BACKGROUND

There are already existing methods of fare collection implemented by public transit service providers or the like. The fares are collected by fare payment terminals hereafter called "validation terminals," installed at entry gates, exit gates or within service zones. These terminals calculate fare payments and validate the customer's access to services.

Payment instruments applied in these systems are customer-held portable devices hereafter called "cards." Examples include smartcards, contactless cards, cellular phones, personal digital assistants and transponders. Fare collection transactions are originated by the cards at validation terminals.

The cards can be issued by worldwide or regional financial payment infrastructure, including but not limited to Visa International or MasterCard Worldwide, hereafter called "payment associations." The cards issued by payment associations are commonly called "open-loop cards." The open-loop cards do not normally store customer related and transaction related data supporting the validation and fare calculation logic. Examples of public transit-specific data not normally stored in the open-loop cards are: preauthorized or prepaid service balance, previous validation activity originated by a card, customer privilege or concession class ('senior'; 'student; etc.) and loyalty parameters specific to a given transit system.

There are also so-called "closed-loop cards" that are used specifically for fare collection. These cards are not issued by payment associations, generally may not be used in the broader market payment infrastructure but are generally restricted to the specific fare collection system for which they are issued.

There are also hybrid fare collection systems comprising both types of cards: open-loop and closed-loop, as well as hybrid payment instruments comprising both types of cards.

Open-loop fare collection systems have certain advantages. For example, customers already having open-loop cards do not need to acquire additional, closed-loop cards and replenish them with funds before they start using a transit system.

The typical public transit fare collection process comprises at least some of the following types of validation transactions executed at validation terminals and originated by cards: "check-in," "check-out," "transfer" and "inspection."

The check-in transaction is typically originated when a customer presents the card to a validation terminal at the beginning of a trip, for example, at the entry gate to a subway station or when boarding a bus or train.

The check-out transaction is typically originated when a customer presents the card to a validation terminal at the end of a trip. Check-out transactions are commonly used by transit systems where the fare depends on the distance traveled (so called distance-based or zone-based fare systems).

The transfer transaction is typically originated when a customer transfers from one route to another, one vehicle to another or one transit entity to another transit entity participating in the same fare collection system. A transfer transaction may sometimes be a variation of a check-in transaction or complementary to a check-in transaction.

An inspection transaction may be implemented in some transit systems to verify the validity of a combination of a fare and trip. An inspection transaction is typically originated when a card is presented to an inspection validation terminal that may be carried by fare-enforcement staff during any phase of a trip.

Card-specific data created or modified during validation transactions is hereafter called "card activity data." Newly created card activity data may be required later, at the succeeding transactions originated by the same card. For example, the check-out fare may depend on a check-in location, the transfer fare may depend on a previous check-in or check-out location or a fare discount may depend on a previous validation transaction. Open-loop cards do not normally store card activity data whereas closed-loop cards usually do.

Open-loop cards, closed-loop cards and fare collection systems using them are well known. An example could be the Oyster card system that has been in use by Transit for London in UK for many years. Initially it was a closed-loop card system. Recently this system started migration to open-loop cards.

A known embodiment of the closed-loop card system is presented in U.S. Pat. No. 6,732,922, by Robert Lindgren et al. In Lindgren, the invention comprises a method of prepaying services i.e. loading the closed-loop card with funds via the Internet before the card can be used in the system. The validation terminals, connected permanently to the service provider's central host, will learn about this load event in a relatively short period of time, but it usually requires significantly more time before this information reaches vehicle-based validation terminals.

A known embodiment of the open-loop card system is presented in U.S. Pat. No. 7,567,920, "On-line authorization in access environment" by Ayman Hammad et al. Hammad introduces a method of registering an open-loop card with a transit system before it can be used at the system's validation terminals. The registration serves the purpose of pre-paying or pre-authorizing a certain amount of funds by means of a regular payment card transaction. The registration also gives an opportunity to authenticate the card and the customer during a relatively lengthy transaction at the registration point of sale. The data associated with the card and the registration transaction is stored in a service provider's central host, so validation terminals connected to this host can validate access to the system and collect the fare fast enough. The validation transaction will require only 0.3-0.5 s, considered to be an upper limit for the validation process duration, whereas the registration transaction may take up to 10 seconds to receive the card issuer authorization.

The aforementioned U.S. Pat. No. 7,567,920 also assumes that while the customer walks from the registration terminal to the validation terminal there is enough time to obtain the card issuer's authorization.

In many known solutions, the service provider's central host stores data describing the card and the customer. This data may include, for example, a positive card list with pre-authorized balances, customer privileges, and discount parameters. The validation terminals execute validation transactions in online mode, being connected to the central host that stores validation support data.

For the purpose of this disclosure, the data pertinent to the card, the customer, and the registration transaction is hereafter called "registration data." The data pertinent to the card usage and fare collection transactions is hereafter called "card activity data." The registration data together with the card activity data is hereafter called "validation support data." The data, other than validation support data, that needs to be propagated to validation terminals in a fare collection system is called hereafter "other terminal data." It may include, for example, a negative lists, fund loading lists, system topology data, route schedules and fare pricelists.

Another example of a system with a registration transaction is presented in the U.S. Pat. No. 7,568,617, "Learning fare collection system for mass transit", by Martin Friedrich Ludwig Silbernagl et al. The method presented in this patent also comprises an open-loop card registration and storing positive card lists (that is, card registration data) in a central host.

There remain, however, the following two issues related to the open-loop systems utilizing validation terminals installed on the moving vehicles:

Issue 1. From a throughput perspective, the validation transaction time must not exceed 300-500 ms. However, validation terminals installed on the moving vehicles typically cannot get the approval response from the service provider's central host in less than 5-10 seconds.

Issue 2. The proper fare calculation at validation terminals requires card activity data that is not typically stored in regular open-loop cards.

Some known solutions, such as that presented in U.S. Pat. No. 7,731,086, "System and method for mass transit merchant payment", by Peter D. Saunders et al, initially charge the maximum fare without connecting to the central host for retrieving the data necessary to calculate the exact fare. The applicable discounts are accounted a day or two later, in a back-office clearing and settlement process, by adjusting the charged amount. This creates inconvenience. The card is temporally overcharged and in some situations this may cause service to be declined due to insufficient funds, even when sufficient funds are available.

Some known solutions allow access to the transit services before the response is received from the central host. In case of a later declined response, the card number is placed in a negative list but the last validated service will remain unpaid. Negative lists are actualized with a certain delay. This method presents the risk of counterfeit cards or cards with insufficient funds.

The known fare collection solutions implement methods of data downloading to the validation terminals via conventional data communication systems wherein the central host or a data concentrator maintains a separate two-way data transmission session with each validation terminal. Since the data package to be delivered to each terminal is the same, these solutions are technically redundant.

There are known solutions for broadcasting identical packages of data to many recipients simultaneously. These solutions have been used in teletext transmission since 1970. Satellite-based high-definition television broadcasting as well as satellite-based or terrestrial based XM radio broadcasting are good examples of digital broadcasting. One more example is U.S. Pat. No. 6,151,497, "Satellite based high bandwidth data broadcast" by David Moon Yee et al. Another example of satellite-based commercial data broadcasting is U.S. Pat. No. 7,562,049, "Payment system and method for data broadcasted from a remote location", by Masayuki Habaguchi et al. This patent discloses a method of selling data segments (i.e. songs) broadcast to a remote location.

An example related to data multicasting to a group of mobile devices is U.S. patent application Ser. No. 10/635,037, "System and method for wireless multicast downloading", by Paul Oommen et al. The multicasting methods may utilize conventional wireless cellular infrastructure. The set of terminals the data is multicast to may be determined dynamically.

SUMMARY

The methods proposed in this invention resolve the aforementioned issues.

One embodiment of the invention is a method comprising storing in the validation terminals and frequent propagating newly created card activity data to all vehicle-installed validation terminals.

Another embodiment of the invention is a method of frequent propagating of vast amount of data to validation terminals by way of data broadcasting or multicasting.

Both embodiments may comprise data stream optimization, such as (i) breaking down validation support data or other terminal data into packages (ii) breaking down validation terminals into subsets, and (iii) transmitting the packages to the subsets of validation terminals in order of priority.

Both embodiments enable the validation terminals to do a fast and accurate decision on service access validity and fare amount.

DETAILED DESCRIPTION OF THE EMBODIMENTS

Figure 1:
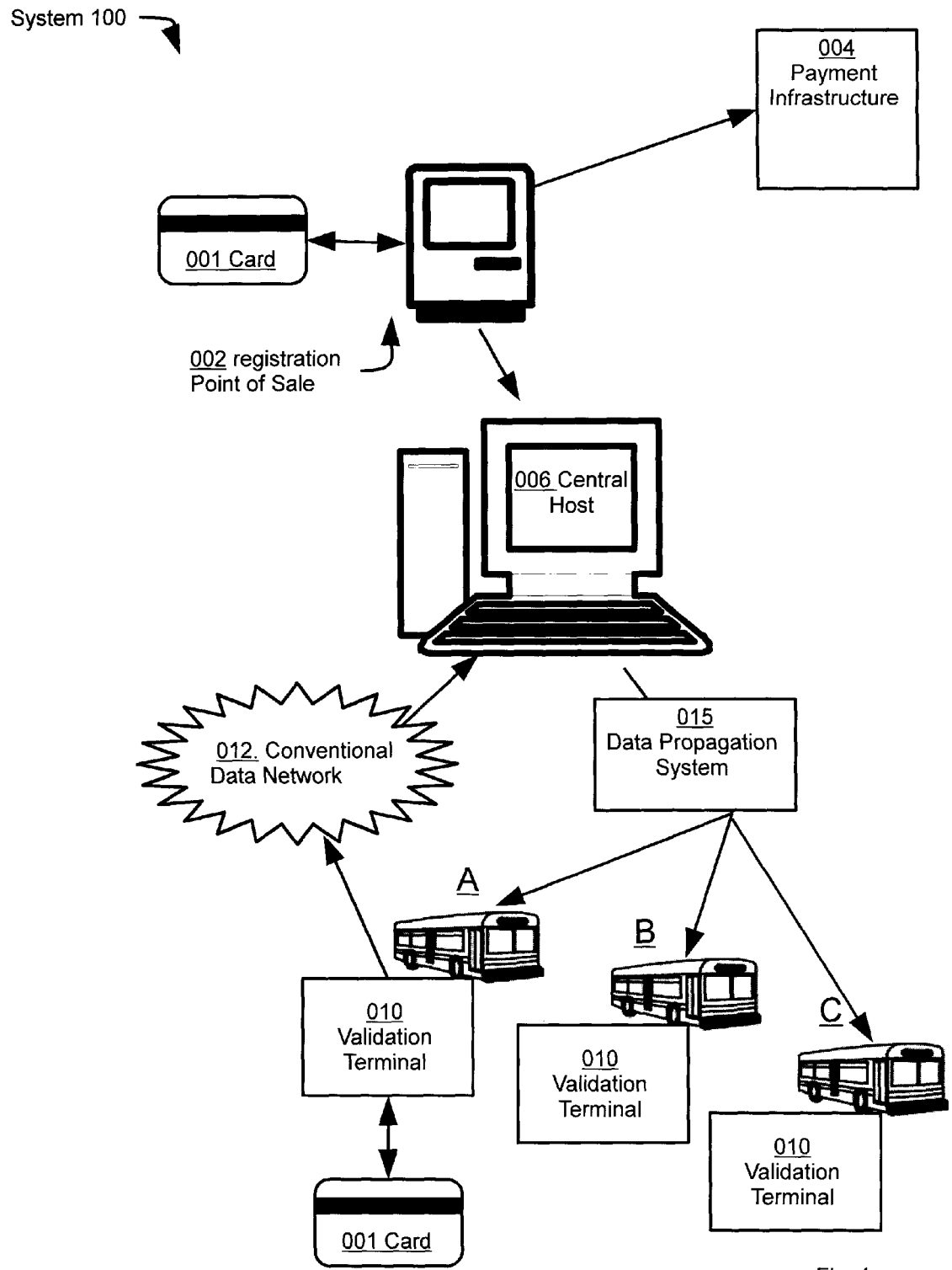
FIG. 1 is a schematic representation of a fare collection system.

Referring to FIG. 1, a fare payment collection system is indicated generally at 100. System 100 comprises the following components:

- a plurality of cards 001 (collectively, cards 001 and generically, card 001);
- a plurality of registration points of sale 002 (collectively, registration points of sale 002 and generically, registration point of sale 002);
- a payment infrastructure 004 comprising the payment card association, payment card issuer server, or analogous services;
- a plurality of validation terminals 010 that may be installed on the moving vehicles (collectively, validation terminals 010 and generically, validation terminal 010). In a present embodiment, moving vehicles are shown as bus A, bus B and bus C in FIG. 1. However, moving vehicles also contemplates street cars, trains, trams or the like;

a central host 006;

a data propagation system 015;

a conventional data network 012.

A card 001 may comprise any of the following payment instruments without limitation: smartcards, mobile phones, personal digital assistants, integrated circuit chips, magnetic stripe cards, transponders, contactless cards, electronic passes, electronic identity documents, barcode tags, computer scannable graphic images, computer scannable data storage devices, computer devices enabled to communicate with fare terminals.

A card 001 may comprise one or more of the following communication capabilities compatible with validation terminal 010 or registration point of sale 002 such as, and without limitation: magnetic stripe reading, near-field communication (NFC), radio-frequency, infra-red, Blue Tooth and barcode scanning.

A card 001 may comprise various form factors including without limitation: plastic cards, key fobs, personal digital assistants, cellular phones and watches.

A card 001 may comprise a variety of the following payment applications, including, without limitation: credit card, debit card, prepaid card, electronic purse, electronic wallet, payment card, gift card, pre-loaded card, loyalty card or any suitable combination thereof, issued by payment infrastructure 004. A registration point of sale 002 may comprise a conventional point of sale, such as without limitation some of VeriFone® or Ingenico® point of sale models, compatible with cards 001 and payment infrastructure 004. Registration point of sales 002 may be connected to central host 006.

Payment infrastructure 004 may comprise a variety of card issuers and payment systems including without limitation: MasterCard Worldwide, Visa International, American Express, Interac, individual financial institutions and transit service providers.

A validation terminal 010 may comprise a computerized device which calculates fares and determines the validity of access to services. Validation terminal 010 may comprise means of communication with cards 001, conventional data network 012 and data propagation system 015.

System 100 may also comprise stationary validation terminals 010 connected to the central host 006, either directly (not shown) or through conventional data network 012. Such stationary validation terminals are most pertinent to railway or subway subsystems. Since they are connected to the central host 006 via a different route, stationary validation terminals may be partially or fully excluded from data propagation. Some types of data may nevertheless be propagated to these types of validation terminals to relieve the burden on the conventional data communication system.

Apart from unattended validation terminals 010 permanently installed at the gates at service provider properties, there may be attended validation terminals 010, stationary or portable, which are used by the service provider personnel for inspection, fare enforcement, fare collection or other purposes.

Validation terminal 010 may comprise a public transit service fare collection terminal. An example of a terminal of that type is Tri-Reader 3 of Cubic® Transportation Systems, Inc. that processes contactless EMV bank cards for use in public transit fare collection systems. However, some hardware and software modification would be required for enabling these validation terminals to render the methods disclosed herein, for example, adding a means of communication with data propagation system 015.

It is generally contemplated that other than public transit industry implementation of system 100 is possible.

Central host 006 may comprise a computerized device connected to registration point of sale 002, conventional data network 012, and data propagation system 015. Central host 006 may comprise a general computing platform such as a mainframe, Unix or Linux based computer with specific software application similar to Nextfare® of Cubic® Transportation Systems. However, some hardware and software modification would be required for enabling a central host like this to render the methods disclosed herein, for example, adding a means of communication with data propagation system 015.

Data propagation system 015 may comprise any existing or newly created technical infrastructure capable of delivering data to all or some validation terminals 010, such as, without limitation, Wi-Fi, conventional cellular wireless systems, satellite data broadcasting systems, terrestrial data broadcasting systems or data multicasting systems.

Conventional data network 012 may comprise a cellular, satellite, Wi-Fi, or any other type of data communication system capable of transmitting relatively small amounts of data from terminals 010 to central host 006. Conventional data network 012 may operate at a relatively slow speed and need not be necessarily be permanently accessible.

Figure 2:
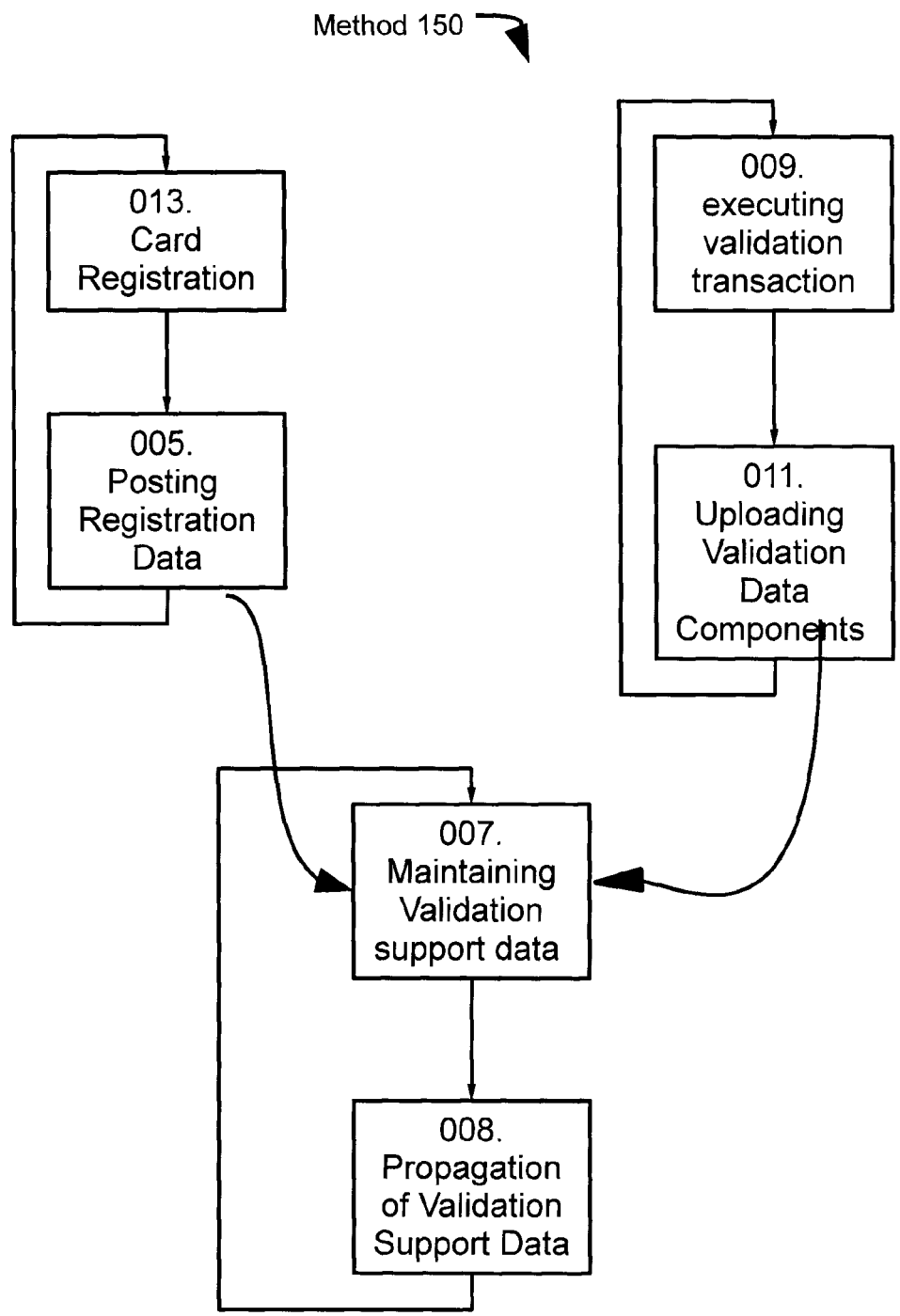
FIG. 2 illustrates a method of actualizing validation support data in the fare collection system.

Referring now to FIG. 2 a method of actualizing card activity data at validation terminals 010 is indicated generally at 150. Method 150 can be implemented on system 100, but it is to be understood that variations on system 100 and method 150 are contemplated.

Block 013 comprises registration of card 001. Registration includes a financial transaction at registration point of sale 002 as well as obtaining financial transaction approval from the payment infrastructure 004.

Block 005 comprises posting by registration point of sale 002, registration data (discussed with reference to FIG. 3 below) associated with a successfully registered card 001 to the central host 006.

Block 009 comprises execution of a validation transaction by card 001 and validation terminal 010 and creating a data element associated with the validation transaction.

Block 011 comprises uploading the validation data components originated at block 009 to the central host 006 when validation terminal 010 is connected with central host 006 via conventional data network 012.

Block 007 comprises maintaining, by central host 006, data hereafter called "validation support data" comprising the registration data posted by registration point of sales 002 at block 005 and the card activity data uploaded by validation terminals 010 at block 011. Block 007 may maintain the validation support data storing this data in a data structure which is illustrated in FIG. 3 as described below.

Block 008 comprises periodical propagation of the validation support data to validation terminals 010.

It is generally contemplated that the sequence of implementation of aforementioned blocks of method 150 can vary as implementation considerations dictate.

Figure 3:
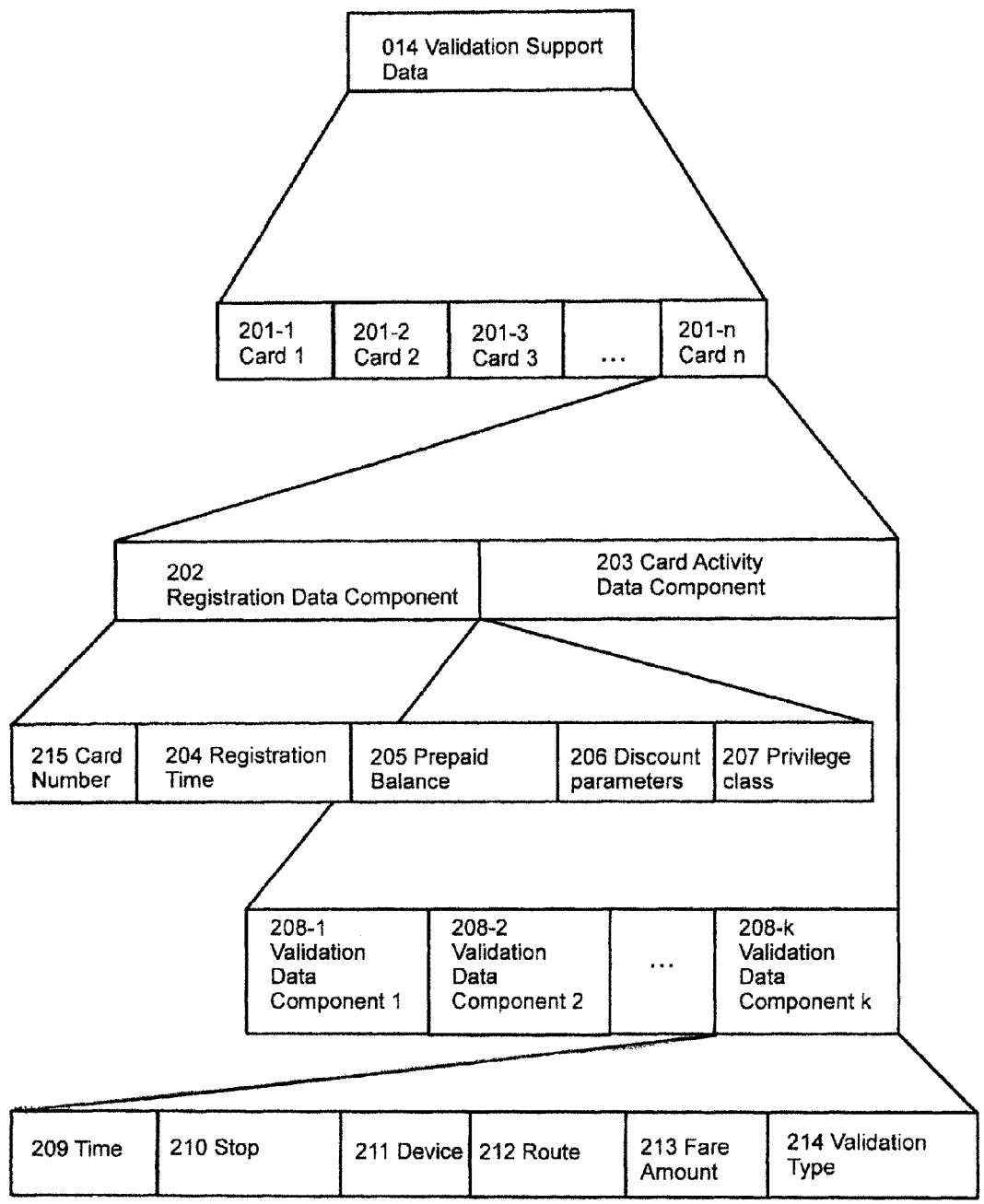
FIG. 3 is a schematic representation of a possible structure and content of validation support data.

Referring now to FIG. 3 an illustrative example of a structure of validation support data 014 that can be prepared and maintained by implementing block 007 of method 150. It is generally contemplated that the data structure utilized in the method 150 may be different from what is presented on the FIG. 3.

Validation support data 014 comprises a plurality of card components 201-1, 201-2, 201-3 . . . 201-$n$ (collectively card components 201 and generically, card component 201) wherein each card component 201 represent one card 001.

The plurality of card components 201 may comprise components that have successfully passed registration 013. In this case, card components 201 effectively comprise a so-called positive card list; the list of cards that generally can be admitted in the fare collection system.

Additionally, validation support data 014 may include other data associated with the card or the customer, according to service provider policies.

Card component 201 can comprise registration data component 202 and card activity data component 203. Registration data component 202 constitutes the above mentioned registration data.

Registration data component 202 may comprise: card number element 215, registration time element 204, prepaid balance element 205, a set of discount parameters 206 or a code of privilege class 207 (sometimes called "concession" such as "senior", "child", etc.). Registration data component 202 may also include other data pertinent to service provider policies.

Card activity data component 203 can comprise a plurality of validation data components 208-1, 208-2 . . . 208-$k$ (commonly, validation data components 208 and generically, validation data component 208) wherein each validation data component 208 describes one validation transaction executed with the given card 001. Card activity data component 203 can also include other data elements pertinent to service provider policies.

Card activity data component 203 may include validation data components 208.

Validation data component 208 comprises characteristics of the given validation transaction: registration time 209, station or stop code 210, bus number 211, route number 212, fare amount 213 and validation type 214 which, in case of a public transportation fare collection system, may be "check-in," "check-out," "transfer," "inspection" or some other type of validation pertinent to service provider policies.

A check-in transaction may be initiated by a customer by presenting a card 001 to a validation terminal 010 at the start of a trip so that the system 100 may track the passenger's usage of the transit system.

A check-out transaction may be initiated by a customer by presenting a card 001 to a validation terminal 010 at the end of a trip so that the system 100 may track the trip distance and time as well as potential points of transfer. Check-out transactions are utilized by transit systems where the fare depends on the distance (so called distance-based or zone-based fare systems).

A transfer transaction may be initiated by a customer by presenting a card 001 to a validation terminal 010 at the point of transferring from one route to another, transferring from one vehicle to another or transferring from one transit entity to another transit entity participating in the same fare collection system. A transfer transaction may be a variation of the check-in transaction or complementary to a check-in transaction.

An inspection transaction is implemented in some transit systems to verify the validity of the combination of the fare and trip. An inspection transaction may be initiated by fare-enforcement staff by presenting a customer's card 001 to a validation terminal 010 in any phase of the trip.

Registration point of sale 002, blocks 013 and 005 of the method 150, as well as registration data component 202 of validation support data 014, are optional. However it is preferable for open-loop card systems in order to reduce fraud while recognizing the need to balance fraud mitigation against inconvenience or delay that may be experienced at the registration step. Block 013 (card registration) may comprise a financial transaction provided by the payment infrastructure, as the open-loop card is a regular payment card. The financial transaction can comprise pre-authorization, pre-payment, advance-payment, security deposit, or any other type of financial transaction supported by the payment infrastructure.

In some embodiments of method 150, block 013 may also comprise checking card 001 authenticity. Validation transactions executed at vehicle-mounted validation terminals in many situations may not have sufficient time to check the card authenticity.

In some embodiments of method 150, block 013 may comprise additional functions such as authenticating the customer and determining his/her belonging to a privileged class (e.g. student, senior citizen), and any other functions specific to service provider policies.

In some embodiments of method 150, block 013, contrary to block 009 (validation), is a relatively lengthy process that may require entering a PIN, collecting a signature, verifying proofs of identity, etc. Registration points of sale 002 may be placed at city or country ports of entry, some public places, subway and railway stations, airports, etc.

Modified validation support data 014 should be timely propagated to all validation terminals 010. The propagation system should be fast enough so that each validation terminal 010 in the system has the updated validation support data by the time the customer reaches it after validating his/her card (or, if system 100 is so configured, registering it) at any other validation terminal 010 or registration point of sale 002. For example, if a customer executes validation transaction 009 at bus A and then transfers to bus B, by the time the customer arrives on bus B, then validation terminal 010 on bus B will, in a normal mode, have already obtained the updated version of validation support data 014 that includes the validation 208 component created at bus A validation terminal 010. However, in an exception mode, if a customer arrives at bus B and the updated version of validation support data 014 does not include the validation transaction 009 at bus A, then an exception process operates according to the transit system policy.

Method 150 is independent of the way validation support data propagation (block 008) is implemented. Block 008 may utilize data propagation system 015 being implemented as a conventional wireless data communication system provided by many cellular carriers. The types of data communication protocols can be 2G, 3G, 4G, HSPA+, LTE or any other available in the specific service provider and cellular carrier environments, or combinations thereof.

Alternatively, block 008 can utilize data propagation system 015 which is implemented as a data broadcasting or multicasting system. The practicality of using a particular data propagation infrastructure depends on the size of data propagation traffic. The following estimates are provided to demonstrate that using a broadcasting or multicasting system for data propagation is reasonable for public transit systems of a certain size.

Table 1 demonstrates the registration data component length for one possible variant of registration data component 202 structure shown on FIG. 2.

TABLE 1

Registration Data Component (Positive List)

| Attribute | Attribute Length (bit) | Limit |
|---|---|---|
| Card number with expiration data | 77 | 23 decimal digits |
| Registration time (sec) | 27 | 8 decimal digits |
| Prepaid balance (cents) | 14 | $160.00 |
| Discount parameters | 27 | 8 decimal digits |
| Customer privilege class code | 8 | 256 classes |

Table 2 demonstrates the card activity data component length for one possible variant of implementation of card activity data component 203 shown on FIG. 2.

TABLE 2

Validation Data Component (Validation Record)

| Attribute | Attribute Length (bit) | Limit |
|---|---|---|
| Card number | 64 | 19 decimal digits |
| Resulted balance (cents) | 14 | $160.00 |
| Resulted discount parameters | 34 | 10 decimal digits |
| Device code | 16 | 64000 |
| Stop point code | 16 | 64000 |
| Timestamp (sec) | 27 | 8 decimal digits |
| Route code | 12 | 4000 routes |
| Validation type code | 4 | 16 transaction types |
| Fare amount | 64 | $160.00 |
| Total per card (bits) | 251 | |

The above estimates of the data component length are approximate. There are factors that may reduce or increase the real data capacity requirements. In practice, there could be cases when more data is required. Data compression may be applied to reduce requirements. Methods of transmission error correction may also be applied that require data redundancy and a consequent increase in requirements.

Feasibility of implementing a conventional cellular data communication system for propagating data to vehicle-installed validation terminals depends on the transit system scale, the state of technology and cellular coverage conditions in a given region. Table 3 defines the scale of a transit system hereafter called a "small transit system" and a "large transit system" respectively.

TABLE 3

Definition of Small and Large Transit Systems

| | Small System | Large System |
|---|---|---|
| Number of cards registered in system | 600,000 | 8,000,000 |
| Number of registrations per day | 100,000 | 2,000,000 |
| Number of cards used daily in a business day | 500,000 | 6,000,000 |
| Number of vehicle-based validation terminals | 500 | 7,500 |
| Number of one-way start-to-end journeys within peak period | 400,000 | 5,000,000 |

Table 4 presents the resulting calculations of total volume for validation support data 014 to be stored in validation terminal 010 and the required parameters of conventional cellular data communication system that could support data propagation requirements for a small and large transit system.

TABLE 4

Data Parameters for Small and Large Transit Systems

| | Small System | Large System |
|---|---|---|
| Total validation support data 014 to be stored in a validation terminal (Mbytes) | 78 | 1,000 |
| Maximum data transmission speed required (Mbit/sec) | 0.40 | 9.2 |
| Monthly traffic per validation terminal (Mbytes/month) | 1,200 | 23,000 |
| Monthly traffic for all validation terminals (Mbytes/month) | 610,000 | 170,000,000 |
| For comparison and feasibility assessment purpose: Number of smartphone users with average data consumption 250 Mbyte/month that would cause the same data traffic in the system | 2,400 | 350,000 |
| For comparison and feasibility assessment purpose: Monthly cost of above data plans assuming $25/plan ($) | 61,000 | 8,700,000 |

Table 4 demonstrates that it is feasible to store the required amount of validation support data 014 in validation terminals 010 using the contemporary technology.

Table 4 also demonstrates that data broadcasting or multicasting implemented for propagating data to validation terminals 010 instead of conventional cellular wireless data transmission system can make the data propagation feasible or decrease the cost of data traffic.

Figure 4:
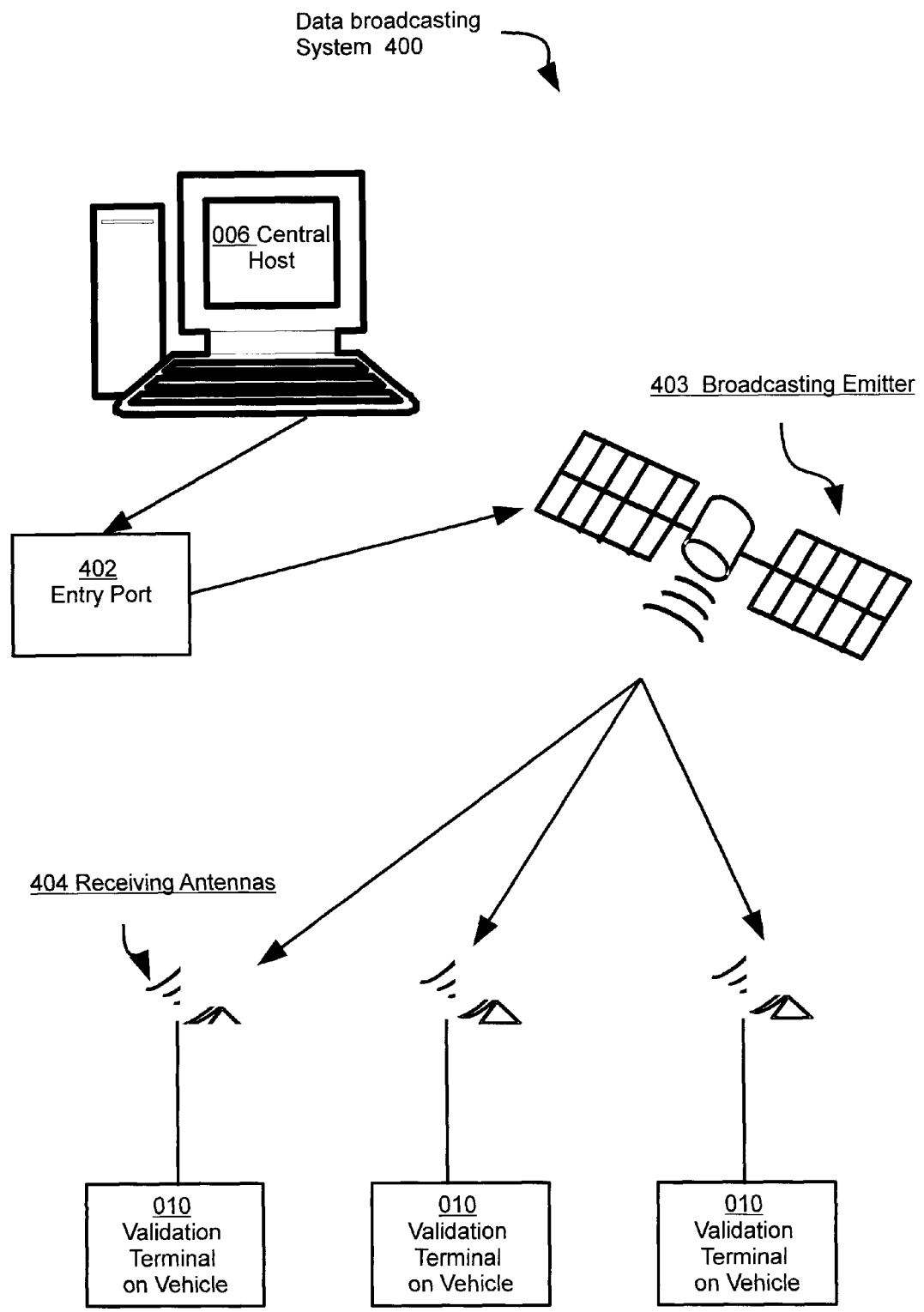
FIG. 4 illustrates a data broadcasting or multicasting system.

Referring to FIG. 4, a data broadcasting system is indicated generally at 400 is one of possible implementations of system 015 (FIG. 1). System 400 can implement one of possible embodiments of method 150 generally indicated as method 401. System 400 comprises the following components:

an entry port 402 connected to central host 006;

a broadcasting emitter 403. A sole satellite-based broadcasting emitter is depicted in FIG. 4 however, it is contemplated that the emitter can be a single ground based emitter. Broadcasting emitter 403 may also comprise multiple emitters (not shown), either satellite based, ground based or a combination. Broadcasting emitter 403 may also be used to broadcast or multicast data.

receiving antennas 404 installed mostly on moving vehicles or moving validation terminals 010, but possibly as stationary terminals as well. Satellite receiving antennas are depicted in FIG. 4 however, it is contemplated that this antenna can be of any other kind permitted by broadcasting or multi-casting technology.

It is generally contemplated that apart from the components depicted in FIG. 4, the real data broadcasting system may further comprise relay stations, modems, data compression systems, data encryption systems, data storage systems and any other components required by data broadcasting and multicasting technology.

It is generally contemplated that the broadcasting system 400 can be satellite-based or terrestrial-based, similar to the XM radio broadcasting system that implements both satellite and terrestrial emitters.

Figure 5:
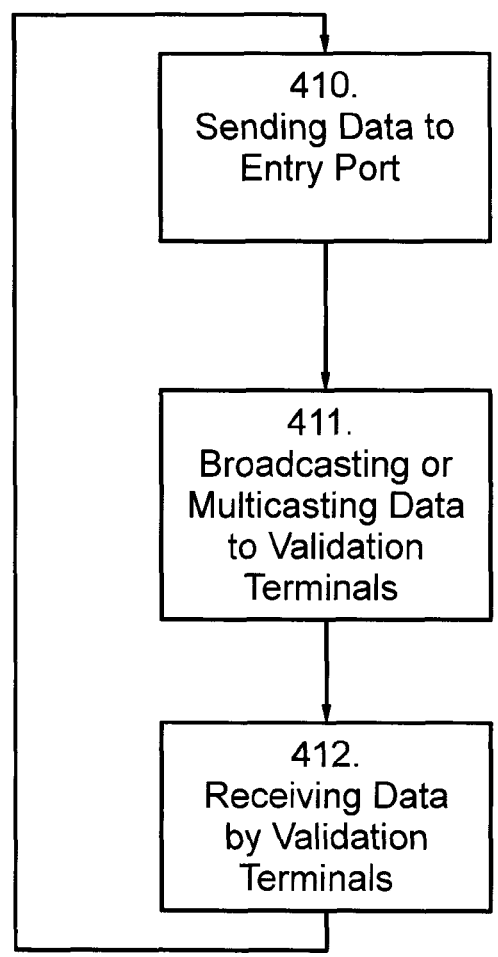
FIG. 5 illustrates a method of data propagation utilizing data broadcasting.

Referring now to FIG. 5, a method implementing block 008 of method 150 is illustrated generally as method 401. Method 401 comprises:

block 410 comprising periodically or continuously sending data to entry port 402 by central host 006 with instructions about the sequence in which the data is to be broadcast. One possible sequence comprises data broadcasting in the order of data sending to entry port 402 (first in, first out);

block 411 comprising broadcasting or multicasting data from the emitter or emitters 403 to receiving antennas 404;

block 412 comprising receiving broadcast data by validation terminals 010 and storing the data therein.

In some embodiments, method 401 can implement data broadcasting comprising sending the same packages of data from one or several sources to many recipients simultaneously. Method 401 can utilize a satellite-based digital broadcasting system that is similar to, the same as or based on high definition television broadcasting systems. Method 401 can also be implemented using a terrestrial-based broadcasting system or a hybrid satellite-base and terrestrial-base similar to or the same as the XM radio broadcasting system.

In other embodiments, method 401 can utilize data multicasting. In this case many emitters can be used wherein the data can be transmitted simultaneously from one emitter to many recipients within this emitter coverage zone.

FIG. 5 depicts the blocks of method 401 processing the same data element sequentially: (1) received by entry port 402; (2) transmitted by emitter 403; (3) received by validation terminals 010. It is generally contemplated that the processes implementing these blocks can be rendered in parallel, processing data streams in various sequences, packaging data in blocks or files, as required by the design details of any particular system 015.

It is generally contemplated that method 401 may not utilize the entire capacity of the broadcasting infrastructure. A certain share of this capacity is required for the purpose of method 401 and an existing digital broadcasting infrastructure or service can be utilized for this purpose. For example, spare bandwidth on the existing XM radio system may be adequate in some circumstances.

In addition to broadcasting and multicasting validation support data 014, some embodiments of method 401 can also broadcast or multicast other data to validation terminals 010. Broadcasting and multicasting data to validation terminals is not known in public transit fare collection industry.

While method 150 comprises propagation of validation support data 014, method 401 makes this propagation practical for large public transit systems. Both methods 150 and 401 can be implemented in open-loop fare collection systems because open-loop cards do not store most components of validation support data 014.

Method 401 can be implemented in closed-loop fare collection systems to propagate any data that can be utilized by validation terminals 010, such as, without limitation negative lists, funds loading lists, system topology data, route schedules and fare pricelists.

Data propagation 008 utilized by method 150 or specifically data broadcasting or multicasting utilized by method 401 may comprise:

breaking down validation support data into packages;
breaking down the set of terminals into subsets;
prioritizing the sequence of propagating the data packages to the terminal subsets and propagating data in order of priority.

An hypothetical example is helpful at this point for illustrative purposes. Assume certain cards 001 were recently checked-in at a subway station validation terminal 010. It is physically impossible that these cards are used at vehicle-installed validation terminals 010 within the next several minutes because the customers first accomplish their subway trips and then exit the subway. Thus, the validation support data 014 associated with these cards 001 can be broadcast later. Conversely, some cards were recently registered at a registration point of sale 001, and they can potentially be used seconds later, at any bus validation terminal 010, stopping near the registration point of sale 002 location. The validation support data 014 associated with these registration transactions may therefore be delivered first to validation terminals 010 on the busses close to this location.

The priority can be based on all or some of the following factors, without limitation:

card usage prediction within a given time interval;
card usage prediction within a given subset of validation terminals;
card types, such as credit, debit, prepaid and closed-loop;
data category stored on the card;
terminal validation transaction mode (offline or online);
types of customer privileges;
terminal geographical position;
probability of future card usage in a given region or validation terminal;
probability of terminal online connection;
probability of validation terminal location in a given area.

Figure 6A:
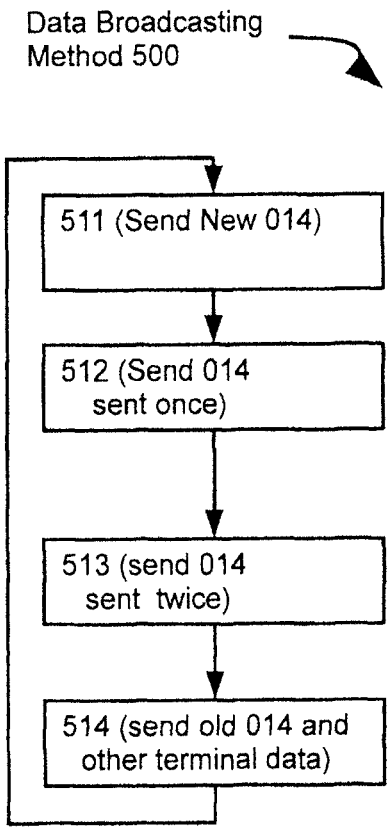
FIG. 6a illustrates a data broadcasting method with an example of order of broadcasting and broadcast data.

Referring now to FIG. 6a one possible method of data broadcast sequencing is illustrated generally as method 500. The data which is to be broadcast comprises validation support data 014. It can also comprise any other data required for validation terminals 010.

Method 500 comprises repeating data broadcasting in an unlimited number of cycles wherein each cycle has a fixed allotted time (for example 2 minutes).

Within each cycle the following blocks are executed sequentially:

block 511 comprises sending a newly created portion of validation support data 014;

block 512 comprises sending a portion of validation support data 014 which has already been broadcast in the previous cycle. This is done to give the opportunity to validation terminals 010 which were not able to receive this data in the first cycle, to actualize validation support data 014 within a second cycle;

block 513 comprises sending a portion of validation support data 014 which has been already sent twice;

block 514 comprises broadcasting any older portion of validation support data 014 and other terminal data.

Block 514 uses the rest of the time allotted to the cycle. This is done to give an opportunity to validation terminals 010 which were recently deployed or reset and do not have validation support data 014 or other data, to gather all data. The data which does not fit in the current cycle 510 will be sent in the next cycle in the package 514, and so on, until all old validation support data 014 and other data is sent.

Figure 6B:
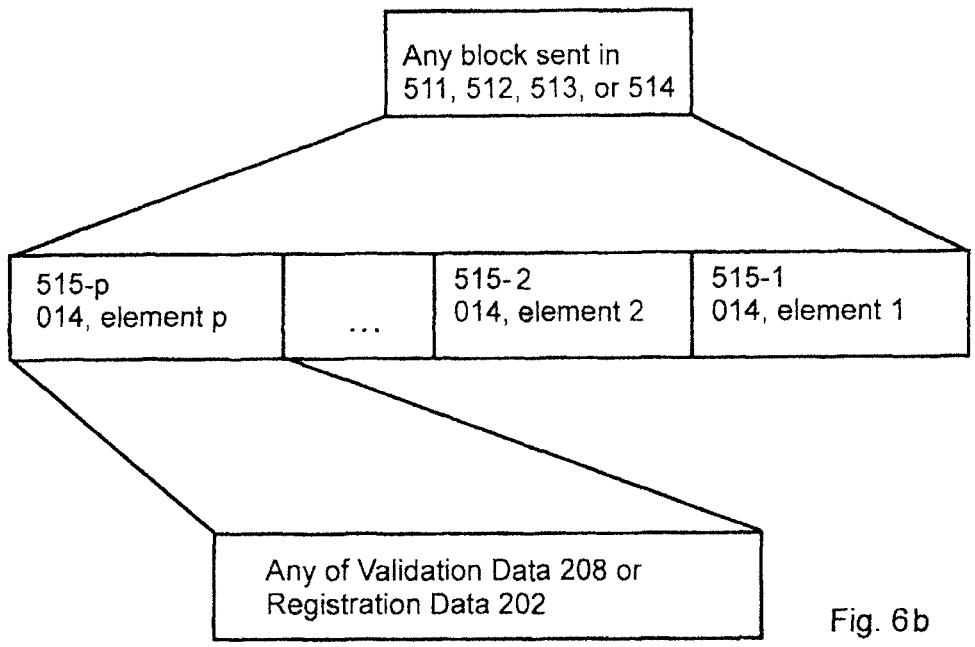
FIG. 6b illustrates an example of broadcast data structure.

Referring now to FIG. 6b, one possible structure of data packages transmitted by method 500 is illustrated. Any of packages 511, 512, 513, or 514 comprises a certain amount (which may vary from package to package) of validation support data 014 packages 515-1, 515-2, . . . 515-$p$ (commonly, packages 515 and generically, packages 515) wherein each package 515 comprises either validation data component 208, or registration data component 202. Elements 515 are broadcast in order of time of their creation. Validation data component 208 or registration data component 202 created first is broadcast first.

Figure 7:
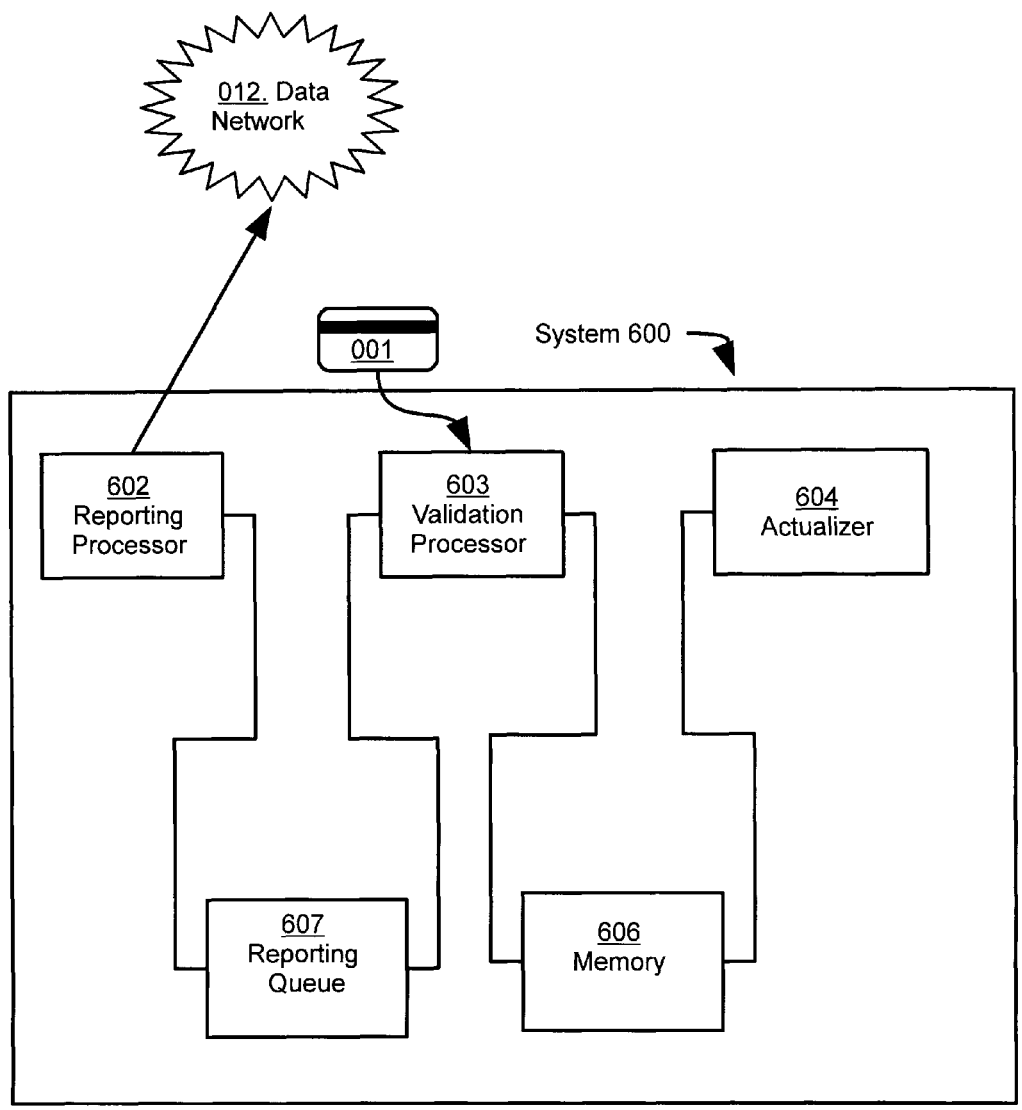
FIG. 7 is a schematic representation of the structure of a validation terminal.

Referring now to FIG. 7, one possible embodiment of validation terminal 010 is illustrated generally as system 600. System 600 is comprised of:

reporting processor 602;
validation processor 603;
actualizer 604;
memory 606;
reporting queue 607.

Reporting processor 602 is connected the conventional data network 012 (FIG. 1). The connection may be permanent or intermittent.

Validation processor 603 is connected to memory 606 where validation support data 014 is stored and periodically actualized and to reporting queue 607.

Memory 606 stores validation support data 014 as well as other terminal data and makes it accessible for validation processor 603 and actualizer 604.

Reporting queue 607 is connected to reporting processor 602 and validation processor 603.

Figure 8:
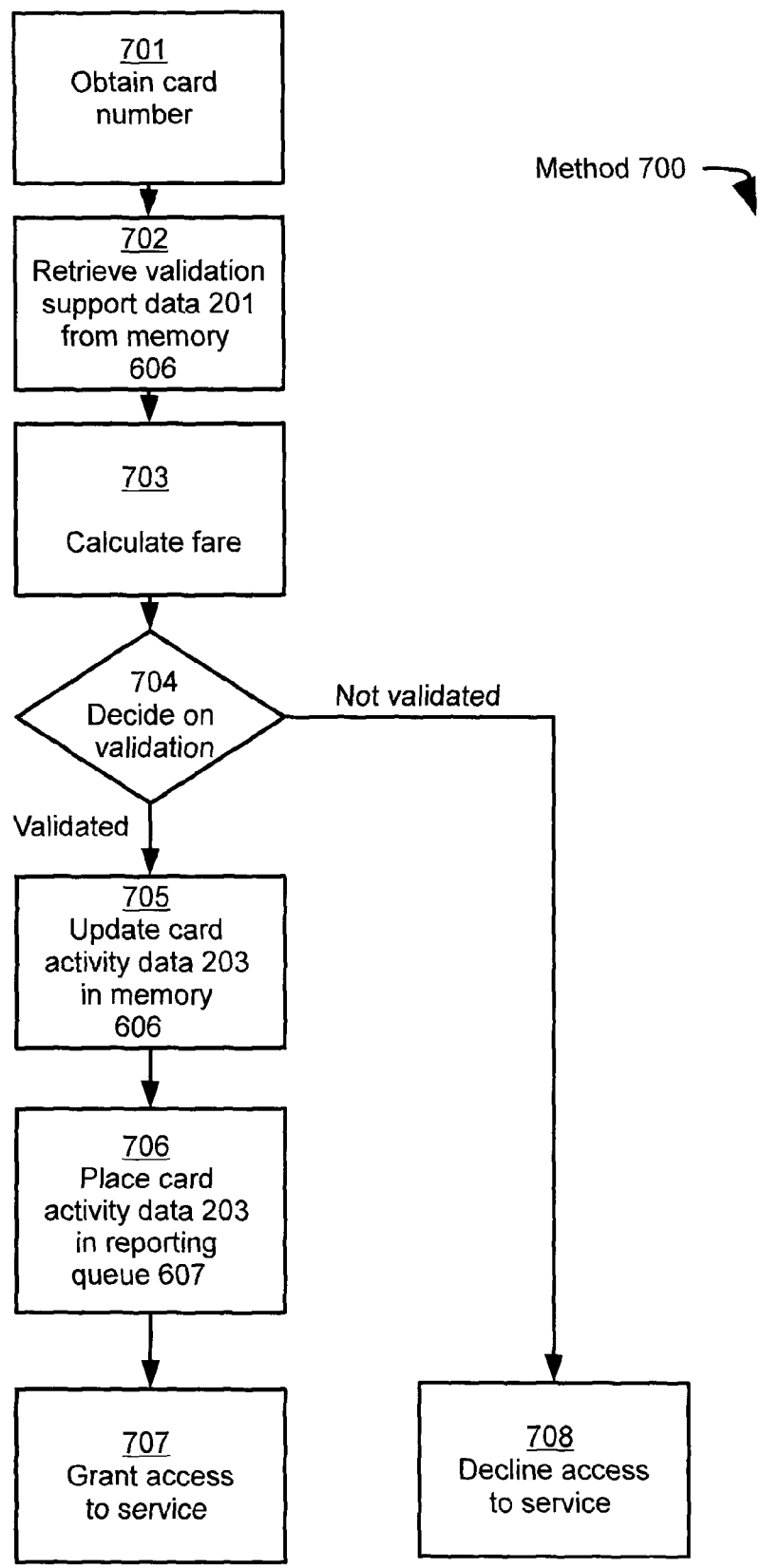
FIG. 8 illustrates a method of fare calculation and validation determination.

Referring now to FIG. 8, one possible embodiment of block 009 of method 150 is illustrated as method 700. Method 700 is implemented on validation processor 603 (FIG. 7). Method 700 starts when card 001 is engaged with the validation processor 603. Method 700 comprises the following blocks:

- block 701, comprises obtaining data from card 001, including card number;
- block 702 comprises retrieving validation support data component 201 (FIG. 3) associated with the given card number from memory 606;
- block 703 comprises calculating a fare using fare calculation logic wherein the aforementioned validation support data component 201 is used as a set of calculation formula parameters;
- block 704 comprises determining whether validation has occurred using decision logic on validation wherein the aforementioned validation support data component 201 is used as a set of decision calculation formula parameters;
- block 705 comprises updating card activity data component 203, created at the current validation transaction 009, in memory 606;
- block 706 comprises placing validation data component 208, created at the current validation transaction, in the reporting queue 607;
- block 707 comprises granting access to the service by means of opening a gate, flashing lights or using some other suitable indicator;
- block 708 comprises declining access to the service by means of blocking a gate, flashing lights or using some other suitable indicator.

It is generally contemplated that real validation logic can be more complicated than the illustrative implementation shown as method 700. For example, registration data may be updated to exclude a card from the positive list if the card balance is used in full, discount parameters may be recalculated to be propagated further as a part of registration data, old registration data which will not be used for further calculation may be removed. Additional refinements will occur to those skilled in the art.

Exception logic is not depicted in FIG. 8. However it is generally contemplated that actual validation transaction logic must assume some behavior in exceptional cases such as late data actualization, absent data elements associated with the card 001 participating in the transaction, insufficient preauthorized balance, counterfeit card, invalid card, card or validation terminal failure, input or output error, etc. This logic will depend on the transit service provider policies.

Figure 9:
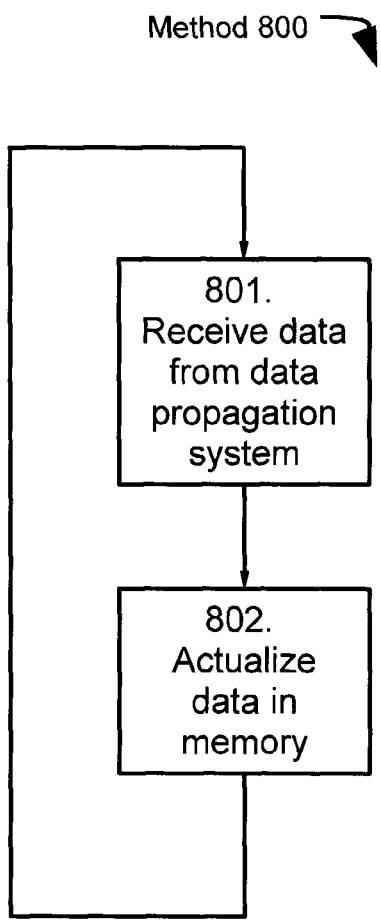
FIG. 9 illustrates one embodiment of a method for receiving data by a validation terminal.

Referring now to FIG. 9, one possible embodiment of block 412 of method 401 or, in general, the validation terminal part of block 008 of method 150 is illustrated as method 800. Method 800 is implemented on actualizer 604 of system 600. Method 800 comprises the following blocks:

- block 801 comprises receiving data from data propagation system 015 or data broadcasting system 400;
- block 802 comprises updating validation support data 014 or other terminal data in memory 606.

Figure 10:
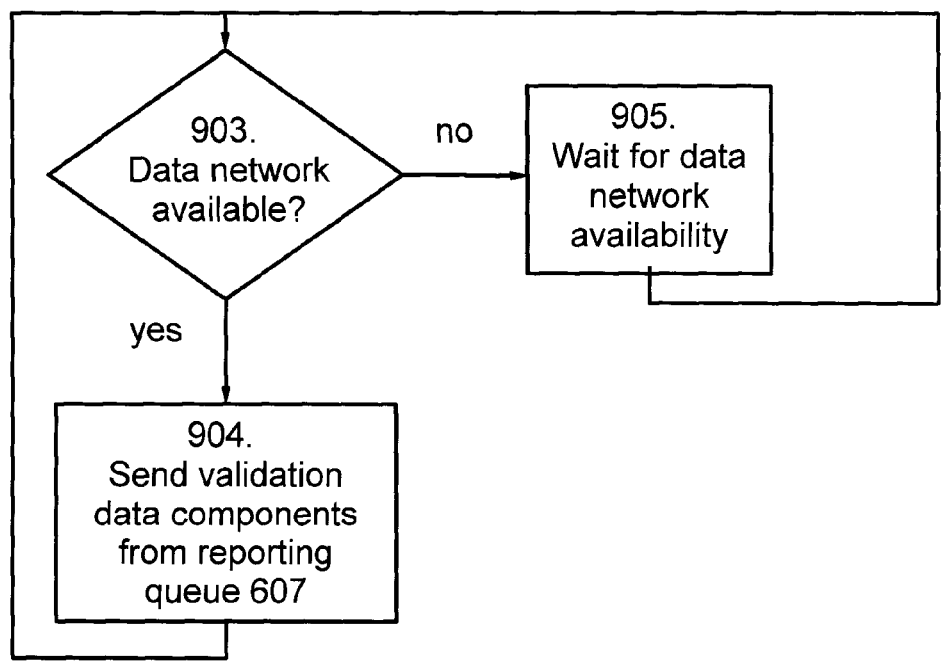
FIG. 10 illustrates one embodiment of a method for uploading card activity data.

Referring now to FIG. 10, one possible embodiment of the validation terminal part of block 011 of method 150 (uploading card activity data) is illustrated generally as method 900. Method 900 is implemented on reporting processor 602 of system 600. Method 900 comprises the following blocks:

- block 903 comprises checking on conventional data network 012 availability and if conventional data network 012 is available, proceeding to block 904, otherwise proceeding to block 905;
- block 904 comprises sending validation data components 208 stored in reporting queue 607 while conventional data network 012 is available wherein sent validation data components 208 are removed from reporting queue 607;
- block 905 comprises waiting for conventional data network 012 to become available.

Blocks 903, 904, and 905 periodically repeat when reporting queue 607 is not empty.

It is generally contemplated that the card numbers and card activity data can be propagated to and stored in validation terminals 010 in encrypted form. The data can also be protected from alteration by means of cryptographically strong checksums, electronic signatures, etc.

The invention claimed is:

1. A system for mass transportation fare collection comprising:
   a first fare validation terminal; said first fare validation terminal being movable or fixed; said first fare validation terminal configured to process a plurality of fare transactions by receiving, by a first payment instrument scanner for each fare transaction, the first payment instrument scanner including at least one of a magnetic stripe reader, a near-field communication (NFC) reader, an integrated circuit chip reader, a radio-frequency reader, a infra-red reader, a Bluetooth reader, and a barcode reader, a payment instrument unique identifier associated with a payment instrument and generating a validation data component associated with said payment instrument unique identifier; said validation data component including at least one of a registration time, a station or stop code, a vehicle-identifier, a route-identifier, a fare amount, and a transfer indicator; said first fare validation terminal configured to assemble said validation data component and said payment instrument unique identifier into fare data;
   a central host aggregating computer system configured to receive said fare data from said first fare validation terminal and to aggregate a plurality of validation data components including said validation data component into validation support data; said central host aggregating computer system further configured to compute a plurality of registration data components including a registration data component into said validation support data, wherein said registration data component includes a prepaid balance and said payment instrument unique identifier;
   a data propagation system wirelessly interconnecting said central host aggregating computer system and a moveable fare validation terminal with an infrastructure configured to deliver data, wherein the data propagation system is configured to broadcast or multicast to said moveable fare validation terminal said movable fare validation terminal configured to store at least a portion of said validation support data in a memory;

said data propagation system configured to send said portion of said validation support data including said registration data component to said movable fare validation terminal before said payment instrument reaches said movable fare validation terminal; and said moveable fare validation terminal configured to receive said portion of said validation support data from said central host aggregating computer system by said data propagation system and to utilize said portion of validation support data for processing an additional fare transaction received by a second payment instrument scanner associated with said payment instrument unique identifier at said movable fare validation terminal; said processing of said additional fare transaction including determining validity of a trip associated with said movable fare validation terminal based on said portion of validation support data and at least one of: applying discounts; calculating an exact fare; calculating said prepaid balance associated with said payment instrument unique identifier; calculating discount parameters associated with said payment instrument unique identifier; and determining a validity of said trip associated with said movable fare validation terminal based on an up-to-date value of said prepaid balance.

2. The system of claim 1, wherein the data propagation system is configured to broadcast or multicast at least one of the following: a list of registered payment instruments, a list of valid payment instruments, a list of invalid payment instruments, an instrument characteristic of the payment instrument, a holder characteristic of a payment instrument holder, a fare rate, a discount rate, a route schedule, a route description, a mass transportation characteristics of the system, a fare collection characteristics of the system, and fare validation terminal software application code.

3. The system of claim 1, further comprising payment infrastructure for issuing or utilizing said payment instrument identifier, said payment instrument configured for executing payment transactions or transferring funds.

4. The system of claim 3, wherein said payment instrument comprises any one of: credit card, debit card, prepaid card, payment card, gift card, pre-loaded card, loyalty card, electronic purse, or electronic wallet.

5. The system of claim 1, wherein said payment instrument comprises any one of: a smartcard, a mobile phone, a personal digital assistant, an integrated circuit chip, a magnetic stripe card, a transponder, a contactless card, an electronic pass, an electronic identity document, a barcode tag, a computer scannable graphic image, a computer scannable data storage device, a computer device configured to communicate with fare validation terminals.

6. The system of claim 1, wherein said fare data comprises at least one of: a trip start point, a trip end point, a transfer point, a fare transaction type, a fare transaction date, a fare transaction time, an identifier of a particular fare validation terminal, a transit route number, a transit vehicle number, funds allocated to be spent by a payment instrument associated with said payment instrument identifier, a fare amount, a discount parameter, a fine parameter, a fee parameter, and a loyalty parameter.

7. The system of claim 1, wherein at least two subsets of said validation support data are propagated to subgroups of a plurality of additional fare validation terminals in order of priority.

8. The system of claim 7, wherein the order of priority is determined by at least one of: payment instrument usage prediction within a given time interval, payment instrument usage prediction within a given subgroup of said plurality of additional fare validation terminals, payment instrument type, data stored on a payment instrument, the geographical location of each additional fare validation terminal of the given subgroup, and the probability of each fare validation terminal of the given subgroup being connected to said data propagation system at a given time.

9. A computer implemented method for collecting fares for a mass transportation fare collection system comprising:

processing a plurality of fare transactions, at a first fare validation terminal, said first fare validation terminal being movable or fixed, by receiving, by a first payment instrument scanner for each fare transaction, a payment instrument unique identifier associated with a payment instrument and generating a validation data component associated with said payment instrument unique identifier; said validation data component including at least one of a registration time, a station or stop code, a vehicle-identifier, a route-identifier, a fare amount, and a transfer indicator;

assembling, at said first fare validation terminal, said validation data component and said payment instrument unique identifier into fare data;

receiving, at a central host aggregating computer system, said fare data from said first fare validation terminal;

aggregating, at said central host aggregating computer system, said validation data components including said validation data component into validation support data;

computing, at said central host aggregating computer system, a plurality of registration data components including a registration data component into said validation support data, wherein said registration data component includes a prepaid balance and said payment instrument unique identifier;

sending a portion of validation support data including said registration data component by a data propagation system that broadcasts or multicasts said portion to a moveable fare validation terminal from said central host aggregating computer system, wherein the data propagation system wirelessly interconnects the central host aggregating computer system and the moveable fare validation terminal with an infrastructure configured to deliver data;

receiving said portion of validation support data at said moveable fare validation terminal from said central host aggregating computer system before said payment instrument reaches said movable fare validation terminal;

storing said portion of validation support data at said movable fare validation terminal; and utilizing said portion of validation support data for processing an additional fare transaction received by a second payment instrument scanner at said moveable fare validation terminal; said processing of said additional fare transaction including determining validity of a trip associated with said movable fare validation terminal based on said portion of validation support data and at least one of: applying discounts; calculating an exact fare; calculating said prepaid balance associated with said payment instrument unique identifier; calculating discount parameters associated with said payment instrument unique identifier; and determining a validity of said trip associated with said movable fare validation terminal based on an up-to-date value of said prepaid balance.

10. The computer implemented method of claim 9, further comprising broadcasting or multicasting to said moveable fare validation terminal at least one of the following: a list of registered payment instruments, a list of valid payment instruments, a list of invalid payment instruments, an instrument characteristic of the payment instrument, a holder characteristic of a payment instrument holder, a fare rate, a discount rate, a route schedule, a route description, a mass transportation characteristics of the system, a fare collection characteristics of the system, and fare validation terminal software application code.

11. The computer implemented method of claim 9, wherein said payment instrument is configured for executing payment transactions or transferring funds.

12. The computer implemented method of claim 11, wherein said payment instrument comprises any one of: a credit card, a debit card, prepaid card, a payment card, gift card, a pre-loaded card, a loyalty card, an electronic purse, or an electronic wallet.

13. The computer implemented method of claim 9 wherein at least two subsets of said validation support data are sent to at least two subgroups of a plurality of additional fare validation terminals in order of priority.

14. The computer implemented method of claim 13 wherein the order of priority is determined by at least one of: payment instrument usage prediction within a given time interval, payment instrument usage prediction within a given subgroup of said plurality of additional fare validation terminals, payment instrument type, data stored on a payment instrument, the geographical location of each additional fare validation terminal of the given subgroup, and the probability of each additional fare validation terminal of the given subgroup being able to receive said validation support data at a given time.

15. The computer implemented method of claim 9, wherein said fare transaction comprises at least one of the following: a fare payment, a validation of access to service, fare collection, registering start of service, registering end of service, registering changing routes, and fare-enforcement inspection.

* * * * *